United States Patent
Wei

(10) Patent No.: US 7,684,223 B2
(45) Date of Patent: Mar. 23, 2010

(54) AUTOMATIC POWER SUPPLY CONVERTING CIRCUIT

(75) Inventor: Gang Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 6 days.

(21) Appl. No.: 12/121,813

(22) Filed: May 16, 2008

(65) Prior Publication Data

US 2009/0096437 A1      Apr. 16, 2009

(30) Foreign Application Priority Data

Oct. 16, 2007   (CN) ......................... 2007 1 0202074

(51) Int. Cl.
H02M 3/18   (2006.01)
H02M 7/04   (2006.01)

(52) U.S. Cl. ........................................ 363/143; 363/61

(58) Field of Classification Search ................ 363/143, 363/61; 323/301, 298
See application file for complete search history.

(56) References Cited

U.S. PATENT DOCUMENTS

| | | | | |
|---|---|---|---|---|
| 4,937,731 A | * | 6/1990 | Konopka | 363/143 |
| 5,045,769 A | * | 9/1991 | Everett, Jr. | 320/107 |
| 6,169,648 B1 | * | 1/2001 | Denvir et al. | 361/25 |

* cited by examiner

Primary Examiner—Shawn Riley
(74) Attorney, Agent, or Firm—Frank R. Niranjan

(57) ABSTRACT

An automatic power supply converting circuit includes a live input terminal, a neutral input terminal, a relay, a regulator, a voltage divider circuit, an identifying circuit, a switch circuit and a voltage doubling circuit. The live input terminal and the neutral input terminal are configured for receiving a first alternating current (AC) voltage. The regulator is configured for filtering and steadying the first AC voltage and outputting a regulated voltage. The voltage divider circuit is configured for sampling the first AC voltage and outputting a divided voltage. The identifying circuit is configured for comparing a divided voltage with a reference voltage, and outputting a control signal. The switch circuit is configured for controlling the relay to be conductive or not. The voltage doubling circuit is capable of being controlled by the relay and outputting a doubled voltage.

13 Claims, 1 Drawing Sheet

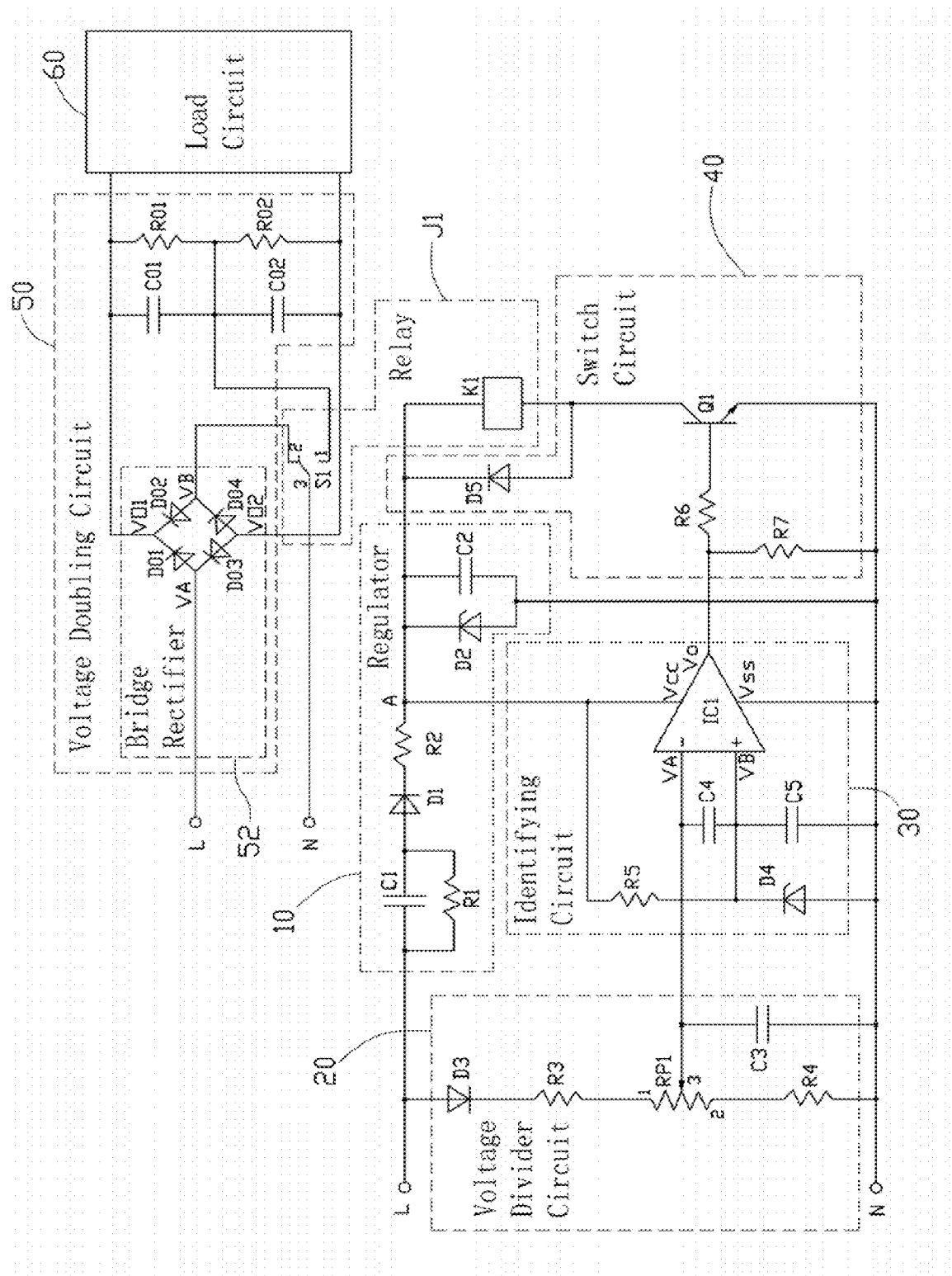

AUTOMATIC POWER SUPPLY CONVERTING CIRCUIT

BACKGROUND

1. Field of the Invention

The present invention relates to an automatic converting circuit of a power supply.

2. Description of Related Art

There are different types of AC power supplies, such as 110V and 220V. Some power circuits of computers integrate a voltage doubling circuit therein to satisfy different power supplies. For example, when the AC power supply is 110V, the users select the voltage doubling circuit through a manual switch, then the voltage doubling circuit converts the AC power supply 110V in 220V, and the load circuit receives the 220V voltage. However, there is a risk of error because the manual switch depends on the users.

What is needed is to provide an automatic power supply converting circuit which can automatically convert 110V to 220V.

SUMMARY

An exemplary automatic power supply converting circuit is configured for converting a first AC voltage to a second AC voltage to a load circuit. The converting circuit includes a live input terminal, a neutral input terminal, a relay, a regulator, a voltage divider circuit, an identifying circuit, a switch circuit and a voltage doubling circuit. The live input terminal and the neutral input terminal are configured for receiving the first AC voltage. The regulator is configured for filtering and steadying the first AC voltage and outputting a regulated voltage. The voltage divider circuit is configured for sampling the first AC voltage and outputting a divided voltage. The identifying circuit which includes a comparator is configured for receiving the divided voltage, comparing the divided voltage with a reference voltage, and then outputting a control signal according to the comparison result. The switch circuit is configured for controlling the relay to be conductive or not according to the control signal. The voltage doubling circuit is capable of being controlled by the relay and outputting a doubled voltage.

Other advantages and novel features of the present invention will become more apparent from the following detailed description of an embodiment when taken in conjunction with the accompanying drawing, in which:

BRIEF DESCRIPTION OF THE DRAWING

A circuit diagram represents an automatic power supply converting circuit which is connected to a load circuit in accordance with an embodiment of the present invention.

DETAILED DESCRIPTION

Referring to the circuit diagram, an automatic power supply converting circuit in accordance with an embodiment of the present invention is configured for automatically supplying a 220V voltage to a load circuit of a computer when an AC power supply is 110V. The converting circuit includes a live input terminal L, a neutral input terminal N, a relay J1, a regulator 10, a voltage divider circuit 20, an identifying circuit 30, a switch circuit 40, and a voltage doubling circuit 50.

The regulator 10 includes two resistors R1 and R2, two diodes D1 and D2, and two capacitors C1 and C2. The resistor R1 and the capacitor C2 are connected in parallel between the input terminal L and an anode of the diode D1. The resistor R2 and the capacitor C2 are connected in series between a cathode of the diode D1 and the input terminal N. An anode of the diode D2 is connected to the input terminal N. A cathode of the diode D2 is connected to a node A between the capacitor C2 and the resistor R2. The regulator 10 regulates the 110V AC power supply and filters noise. The node A acts as an output terminal of the regulator 10 to output a regulated voltage. In this embodiment, the resistances of the resistors R1, R2 are respectively 1 MΩ and 22Ω, and the capacitances of the capacitors C1, C2 are respectively 1 µF and 470 µF.

The voltage divider circuit 20 includes a diode D3, two resistors R3 and R4, a capacitor C3, and a variable resistor RP1. The variable resistor RP1 includes two opposites, terminals 1, 2 and a sliding terminal 3. An anode of the diode D3 is connected to the input terminal L. A cathode of the diode D3 is connected to the terminal 1 of the variable resistor RP1 via the resistor R3. The terminal 2 of the variable resistor RP1 is connected to the input terminal N via the resistor R4. The sliding terminal 3 of the variable resistor RP1 is connected to the input terminal N via the capacitor C3. The sliding terminal 3 acts as an output terminal of the voltage divider circuit 20 to output a divided voltage. In this embodiment, the resistances of the resistors R3, R4 are respectively 330KΩ and 10KΩ, the maximum resistance of the variable resistor RP1 is 47KΩ, and the capacitance of the capacitor C3 is 47 µF.

The identifying circuit 30 includes a resistor R5, two capacitors C4 and C5, a diode D4, and a comparator IC1. The resistor R5 is connected between a non-inverting input terminal VB and a positive power supply terminal Vcc of the comparator IC1. A positive power supply terminal Vcc of the comparator IC1 is connected to a node A of the regulator 10. A inverting input terminal VA of the comparator IC1 is connected to the sliding terminal 3 of the variable resistor RP1. The capacitor C4 is connected between the non-inverting input terminal VB and the inverting input terminal VA. The capacitor C5 is connected between the non-inverting input terminal VB and the input terminal N. A cathode of the diode D4 is connected to the non-inverting input terminal VB. An anode of the diode D4 is connected to the input terminal N. The input terminal N is connected to a negative power supply terminal Vss of the comparator IC1. The node between the resistor R5 and the diode D4 outputs a reference voltage from the regulator 10 to the non-inverting input terminal VB of the comparator IC1. In this embodiment, the resistance of the resistor R5 is 2.2KΩ, and the capacitances of the capacitors C4, C5 are respectively 47 nF and 0.1 µF.

The relay J1 includes a coil K1 and a switch S1. The switch circuit 40 includes two resistors R6 and R7, a transistor Q1, and a diode D5. The resistor R7 is connected between an input terminal N and an output terminal Vo of the comparator IC1. An output terminal Vo of the comparator IC1 is connected to a first terminal (base) of the transistor Q1 via the resistor R6. A second terminal (emitter) of the transistor Q1 is connected to the input terminal N. A third terminal (collector) of the transistor Q1 is connected to an anode of the diode D5. A cathode of the diode D5 is connected to the node A. The coil K1 is connected between the node A and the third terminal of the transistor Q1. In this embodiment, the resistances of the resistors R6, R7 are respectively 10KΩ and 22KΩ.

The voltage doubling circuit 50 includes a bridge rectifier 52, two capacitors C01 and C02, and two resistors R0 and R02. The bridge rectifier 52 includes four diodes D01, D02, D03 and D04. A positive input terminal VA of the bridge rectifier 52 is connected to the input terminal L. A positive output terminal VO1 of the bridge rectifier 52 is connected to a negative output terminal VO2 of the bridge rectifier 52 via the capacitors C0 and C02 in series and also via the resistors R0 and R02 connected in series. The node between the capacitors C01 and C02 is connected to the node between the resistors R01 and R02. The switch S1 is a single-pole double-throw switch, and includes a first contact 1, a second contact 2 and a common terminal 3. A negative input terminal VB of bridge rectifier 52 is connected to the second contact 2 of switch S1. The first contact 1 of switch S1 is connected to the node between the capacitors C0 and C02. The common terminal 3 of switch S1 is connected to the input terminal N. A load circuit 60 is connected between the positive output terminal VO1 and the negative output terminal VO2 of the bridge rectifier 52.

In working, the AC power supply is input via the input terminal L and the input terminal N, and filtered and steadied by the regulator 10. The node A outputs the regulated voltage to the identifying circuit 30 and the switch circuit 40. The voltage divider circuit 20 samples the input voltage, and then outputs the divided voltage to the VA of the comparator IC1 of the identifying circuit 30.

The non-inverting input terminal VB of the comparator IC1 is provided with the reference voltage by the node between the resistor R5 and the diode D4, the comparator IC1 compares the divided voltage with the reference voltage, and then outputs a control signal to the transistor Q1 of the switch circuit 40. The transistor Q1 is turned on or off according to the control signal, thereby controlling the coil K1 to be conductive or not. Thereinto, when the divided voltage is less than the reference voltage, the comparator IC1 outputs a high voltage control signal; when the divided voltage is greater than the reference voltage, the comparator IC1 outputs a low voltage control signal. In this embodiment, the reference voltage is 6V.

When the comparator IC1 outputs the low voltage control signal, the transistor Q1 is turned off, the coil K1 is conductive, the common terminal 3 of the switch S1 is connected to the second contact 2 of the switch S1, and the voltage doubling circuit 50 outputs the input voltage from the input terminal L and the input terminal N. When the comparator IC1 outputs a high voltage control signal, the transistor Q1 is turned on, the coil K1 is not conductive, and the common terminal 3 of the switch S1 is connected to the first contact 1 of the switch S1, and the voltage doubling circuit 50 works in a voltage doubling mode to outputs a voltage that is double to the input voltage from the input terminal L and the input terminal N.

For example, a load circuit 60 requires 220V. Before using the converting circuit, the variable resistor RP1 is adjusted as follows. 110V AC power is supplied between the input terminal L and the input terminal N, and sliding the sliding terminal 3 of the variable resistor RP1 through manual to change the valuable resistance of the variable resistor RP1 to make the divided voltage of the voltage divider circuit 20 be 4-5V. In other embodiments, the variable resistor RP1 can be deleted, then make the voltage at the node between the resistors R3 and R4 be 4-5V via changing the resistances of the resistors R3 and R4. After adjusting the resistance, the automatic power supply converting circuit is put into use. When the AC power supply is 110V, the divided voltage is less than the reference voltage, and then the comparator IC1 outputs a high voltage control signal. The transistor Q1 is turned on, and the common terminal 3 of the switch S1 is connected to the first contact 1 of the switch S1. The voltage doubling circuit 50 works in the voltage doubling mode and provides the load circuit 60 with 220V.

When the AC power supply is 220V, the divided voltage is greater than the reference voltage, and the comparator IC1 outputs a low voltage control signal. The transistor Q1 is turned off, and the common terminal 3 of the switch S1 is connected to the second contact 2 of the switch S1. The voltage doubling circuit 50 provides the 220V to the load circuit 60 directly.

The capacitor C3 can absorb the instant pulse at the instant of connecting to or disconnecting from the AC power supply. The resistor C4 can remove the instant pulse between the converting input terminal VA and the non-inverting input terminal VB, thereby preventing the comparator IC1 misjudging. The diode D5 protects the coil K1 of the relay J1 via absorbing the reverse high voltage of the coil K1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatic power supply converting circuit, the automatic power supply converting circuit comprising:
    a live input terminal and a neutral input terminal configured for receiving a first AC voltage;
    a relay;
    a regulator configured for filtering and steadying the first AC voltage and outputting a regulated voltage;
    a voltage divider circuit configured for sampling the first AC voltage and outputting a divided voltage, wherein the voltage divider circuit comprises a first resistor, a second resistor, and a variable resistor comprising a first terminal connected to the live input terminal via the first resistor, a second terminal connected to the neutral input terminal via the second resistor, and a sliding terminal acting as an output of the divider circuit to output the divided voltage;
    an identifying circuit comprising a comparator for receiving the divided voltage and comparing the divided voltage with a reference voltage, and outputting a control signal according to the comparison result;
    a switch circuit configured for controlling the relay to be conductive or not according to the control signal; and
    a voltage doubling circuit capable of being controlled by the relay and outputting a doubled voltage.

2. The automatic power supply converting circuit as claimed in claim 1, wherein the regulator comprises a first capacitor, a second capacitor, a third resistor, a fourth resistor, a first diode and a second diode;
    wherein the first diode comprises a first diode anode and a first diode cathode; and the second diode comprises a second diode anode and a second diode cathode;
    wherein the first capacitor and the third resistor are connected in parallel between the live input terminal and the first diode anode, the first diode cathode is connected to the neutral input terminal via the second capacitor and the fourth resistor, the second diode anode is connected to the neutral input terminal, the second diode cathode is connected to a node between the fourth resistor and the second capacitor, and the node acts as an output terminal of the regulator to output a regulated voltage to the identifying circuit and the switch circuit.

3. The automatic power supply converting circuit as claimed in claim 1, wherein the voltage divider circuit further comprises a diode;

an anode of the diode is connected to the live input terminal, a cathode of the diode is connected to the neutral input terminal via the first resistor, the variable resistor and the second resistor in series, and the sliding terminal of the variable resistor is connected to the identifying circuit.

4. The automatic power supply converting circuit as claimed in claim 3, wherein the voltage divider circuit comprises a capacitor connected between the sliding terminal of the variable resistor and the neutral input terminal.

5. The automatic power supply converting circuit as claimed in claim 1, wherein the identifying circuit further comprises a resistor, a first capacitor, a second capacitor, a diode and a comparator;
wherein the resistor is connected between a positive power supply terminal and a non-inverting input terminal of the comparator, the first capacitor is connected between the non-inverting input terminal and an inverting input terminal of the comparator, the second capacitor is connected between the non-inverting input terminal and the neutral input terminal, and an anode of the diode is connected to the neutral input terminal, a cathode of the diode is connected to the non-inverting input terminal.

6. The automatic power supply converting circuit as claimed in claim 5, wherein a positive power supply terminal of the comparator is connected to an output of the regulator, a negative power supply terminal of the comparator is connected to the neutral input terminal, the inverting input terminal of the comparator is connected to the voltage divider circuit to receive the divided voltage, and an output terminal of the comparator is connected to the switch circuit.

7. The automatic power supply converting circuit as claimed in claim 1, wherein the switch circuit comprises a third resistor, a fourth resistor, a diode and a transistor, a relay includes a coil and a switch;
wherein the third resistor is connected between an output of the comparator and a base of the transistor, the fourth resistor is connected between an output of the comparator and the neutral input terminal, an emitter of the transistor is connected to the neutral input terminal, a collector of the transistor is connected to an anode of the diode, a cathode of the diode is connected to an output of the regulator, the coil of the relay is connected between a collector of the transistor and an output of the regulator.

8. The automatic power supply converting circuit as claimed in claim 1, wherein the voltage doubling circuit comprises a bridge rectifier, a first capacitor, a second capacitor, a third resistor, and a fourth resistor, the relay has a single-pole double-throw switch and the switch comprises a first contact, a second contact and a common terminal;
wherein a positive input terminal of the bridge rectifier is connected to the live input terminal, a negative input terminal of the bridge rectifier is connected to the second contact, the common terminal is connected to the neutral input terminal, the positive output terminal is connected to the negative output terminal via the first capacitor and the second capacitor connected in series and also via the third resistor and the fourth resistor connected in series; a first contact of the switch is connected to a node between the first capacitor and the second capacitor, the node between the first capacitor and the second capacitor is connected to a anode between the third resistor and the fourth resistor, and the load circuit is connected between the positive output terminal and the negative output terminal.

9. An automatic power supply converting circuit configured for automatically outputting a required alternating current (AC) voltage on the condition that an inputted AC voltage is less than the required AC voltage, the converting circuit comprising:
a live input terminal and a neutral input terminal configured for receiving the input AC voltage;
a voltage divider circuit configured for sampling the input AC voltage and outputting a divided voltage, wherein the voltage divider circuit comprises a first resistor, a second resistor, and a capacitor, the first resistor and the second resistor are connected in series between the live input terminal and the neutral input terminal, and a node between the first resistor and the second resistor acts as an output of the divider circuit, the capacitor connected between the node and the neutral input terminal;
an identifying circuit comprising a comparator capable of comparing the divided voltage with a reference voltage, and outputting a control signal according to the comparison result;
a switch comprising a first contact, a second contact, and a common terminal, the common terminal is connected to the neutral input terminal; and
a voltage doubling circuit comprising a bridge rectifier,
wherein the bridge rectifier comprises a positive output terminal connected to the first contact of the switch and a negative input terminal connected to the second contact of the switch.

10. The automatic power supply converting circuit as claimed in claim 9, further comprising a load circuit connected between the positive output terminal and the negative output terminal of the bridge rectifier.

11. A method for automatically converting the power supply comprising of:
providing a live input terminal and a neutral input terminal;
a relay;
a voltage divider circuit;
an identifying circuit comprising a comparator;
a switch circuit; and
a voltage doubling circuit;
wherein an AC voltage is supplied between the live input terminal and the neutral input terminal; the voltage divider circuit samples and divides the AC voltage; the comparator compares the divided voltage from the divider circuit to a reference voltage, and identifying circuit instructs the voltage doubling circuit; and
wherein the identifying circuit further comprises a resistor, a first capacitor, a second capacitor, and a diode, the resistor is connected between a positive power supply terminal and a non-inverting input terminal of the comparator, the first capacitor is connected between the non-inverting input terminal and an inverting input terminal of the comparator, the second capacitor is connected between the non-inverting input terminal and the neutral input terminal, and an anode of the diode is connected to the neutral input terminal, a cathode of the diode is connected to the non-inverting input terminal.

12. The method of claim 11, wherein the AC voltage is 110V, the divided voltage is less than the reference voltage, the identifying circuit instructs the voltage doubling circuit to double the voltage; and the doubled voltage is outputted to a device.

13. The method of claim 11, wherein the AC voltage is 220V, the divided voltage is greater than the reference voltage, the identifying circuit instructs the voltage doubling circuit to output the AC voltage, and the AC voltage is outputted to a device.

* * * * *